United States Patent [19]

Serrander

[11] Patent Number: 4,697,872

[45] Date of Patent: Oct. 6, 1987

[54] APPARATUS FOR MUTUALLY ALIGNING THE ENDS OF TWO OPTICAL FIBRES THAT ARE TO BE CONNECTED

[75] Inventor: Hans R. Serrander, Bondegatan, Sweden

[73] Assignee: Telefonaktiebolaget L M Ericsson, Stockholm, Sweden

[21] Appl. No.: 574,094

[22] PCT Filed: May 25, 1983

[86] PCT No.: PCT/SE83/00207

§ 371 Date: Dec. 29, 1983

§ 102(e) Date: Dec. 29, 1983

[87] PCT Pub. No.: WO83/04318

PCT Pub. Date: Dec. 8, 1983

[30] Foreign Application Priority Data

May 27, 1982 [SE] Sweden .................................. 8203303

[51] Int. Cl.[4] ................................................ G02B 6/38
[52] U.S. Cl. ................................ 350/96.21; 350/96.20
[58] Field of Search ............... 350/96.10, 96.15, 96.20, 350/96.21, 96.22

[56] References Cited

U.S. PATENT DOCUMENTS

| 4,181,401 | 1/1980 | Jensen | 350/96.21 |
| 4,339,172 | 7/1982 | Leather | 350/96.21 |
| 4,380,366 | 4/1983 | Franken et al. | 350/96.21 |
| 4,391,487 | 7/1983 | Melman et al. | 350/96.20 |
| 4,486,072 | 12/1984 | Roberts | 350/96.21 |

FOREIGN PATENT DOCUMENTS

| 2917679 | 11/1979 | Fed. Rep. of Germany ... 350/96.21 |
| 2475748 | 8/1981 | France ............................... 350/96.21 |
| 53-70835 | 6/1978 | Japan ................................ 350/96.21 |

OTHER PUBLICATIONS

Satake et al., "Molded Multifibre . . . Arrangement", Elect. Lett., vol. 16, No. 8, pp. 281–282, 4/80.

Primary Examiner—William L. Sikes
Assistant Examiner—Brian M. Healy
Attorney, Agent, or Firm—Roberts, Spiecens & Cohen

[57] ABSTRACT

The apparatus comprises at least three parallel rods (1, 2, 3) adapted to form between themselves a channel (4) for accommodating the ends of the two fibres, and means for keeping the rods together and clamping the fibre ends in the channel between the rods. In accordance with the invention, each rod (1, 2, 3) has two plane surfaces (7, 12; 8, 9; 10, 11) intersecting along a longitudinal edge. One of these plane surfaces on the respective rods bears against one of these plane surfaces on an adjacent rod such that said longitudinal edges of the rods extend parallel to, and are distributed round a longitudinal axis of symmetry (6). The rods are further mutually displaceable relative to the axis of symmetry (6) by sliding between the plane surfaces bearing against each other to form the channel (4) for accommodating the fibre ends.

5 Claims, 2 Drawing Figures

APPARATUS FOR MUTUALLY ALIGNING THE ENDS OF TWO OPTICAL FIBRES THAT ARE TO BE CONNECTED

FIELD OF THE INVENTION

The present invention relates to an apparatus for mutually aligning the ends of two optical fibers which are to be connected, and includes at least three parallel rods adapted to mutually form a channel for accommodating the ends of the two fibers as well as means for keeping the rods together and clamping the fiber ends in the channel between the rods.

BACKGROUND ART

It is known to align two optical fibers with the aid of three cylindrical rods, for example, which between themselves form a channel, from either end of which the respective fibre end is inserted. Accurate alignment is obtained only when the rods bear against each other to form the channel. This means that rods of different diameters are required for different fiber diameters.

In U.S. Pat. No. 4,380,366 corresponding to DE-OS No. 2917679 there is known an aligning apparatus with three rods, with which fibers of different diameters can be aligned by having the rods provided with a plane surface and made rotatable to form a channel with variable opening area between the plane surfaces of the rods. The design of this aligning apparatus is complicated, however, therefore making it expensive and difficult to manufacture.

SUMMARY OF THE INVENTION

An object of the present invention is to provide an aligning apparatus for aligning optical fibres of different diameters, which apparatus is simple and inexpensive to manufacture.

This object is achieved by the aligning apparatus in accordance with the invention which comprises at least three parallel rods forming between themselves a channel for accommodating the ends of the two fibers which are to be aligned. The rods are maintained together and clamp the fiber ends in the channel. Each rod has a polygonal section with at least two plane surfaces intersecting along a longitudinal sharp edge. The rods are assembled such that opposing pairs of the plane surface bear flat against one another and are mutually displaced so that a portion of the flat plane surfaces which bear against one another form bounding plane sides of the channel and said longitudinal edges extend parallel to and are distributed around a longitudinal axis of symmetry of the channel. The rods are slidably adjustable along the plane surfaces to vary the magnitude of the mutual displacement and thereby vary the size of the channel whereby fibers of different diameter can be accommodated. The plane sides of the channel formed by the plane surfaces of the rods which bear against one another define a polygonal section for said channel which remains geometrically similar for different size channels.

BRIEF DESCRIPTION OF THE DRAWING

The invention will now be described in detail below with reference to the accompanying drawing, in which.

DETAILED DESCRIPTION OF BEST MODES FOR CARRYING OUT OF THE INVENTION

Figure 1:
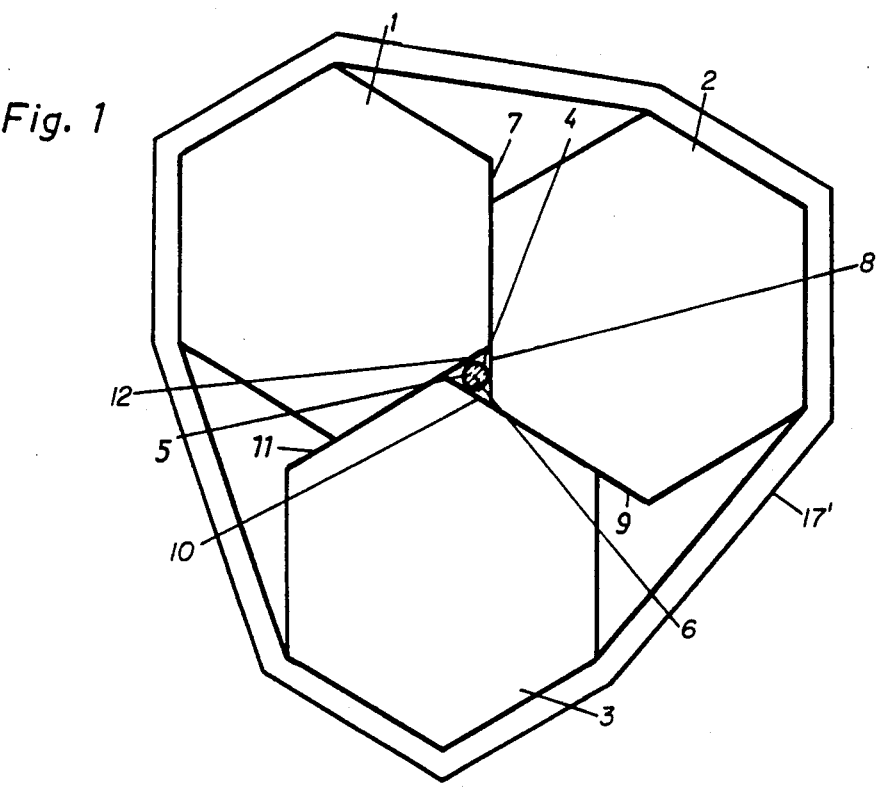
FIG. 1 is an end view of a first embodiment of the aligning apparatus in accordance with the invention.

FIG. 1 schematically illustrates an end view of a first embodiment of the aligning apparatus in accordance with the invention. This embodiment includes three hexagonal rods 1, 2 and 3 of metal, glass, plastics or the like. The rods extend mutually parallel and are placed upon each other such that they form a channel 4 for accommodating the ends of two fibers which are to be connected, one of such fibers being shown in section and denoted by the numeral 5. For bringing the rods in the right position relative to each other and to facilitate the insertion of the fibers between the rods, a rod-like member with circular section can be inserted beforehand between the rods, this member being removed in conjunction with the insertion of one of the fibers between the rods. The rods 1, 2 and 3 are kept together by an elastic means, e.g., a number of rubber O-rings 17.

In accordances with the invention, each rod has two plane surfaces intersecting along a longitudinal edge, and the rods are supported on one another such that one of the plane surfaces of each rod bears against one of the plane surfaces of an adjacent rod, so that longitudinal edges of the rods along which the two plane surfaces intersect extend parallel to, and are distributed round a longitudinal axis of symmetry 6.

In the case with three rods according to FIG. 1, the plane surface 7 of rod 1 bears against the plane surface 8 of rod 2, while the plane surface 9 of rod 2 bears against the plane surface 10 of rod 3, and the plane surface 11 of rod 3 bears against the plane surface 12 of rod 1. The rods 1, 2 and 3 are mutually displaceable relative to the axis of symmetry 6 relative sliding between the plane surfaces that bear against each other to form the channel 4 for the fiber ends. The means for displacing the rods relative to the axis of symmetry 6 are not part of the invention and are therefore not illustrated in the drawing.

From an initial position, in which the rods 1, 2 and 3 either are completely brought together so that the opening area of the channel 4 is practically zero, or are displaced a predetermined distance relative to each other to be able to accomodate fibers up to a predetermined diameter in the channel, e.g. with the aid of the aforementioned rod-like member, the rods can be displaced into engagement with their plane surfaces 8, 10 and 12, respectively, against the fibers inserted into the channel 4.

When splicing the fibers, the fiber ends must be cut off uniformly and square and be provided with cement or a refractive index-matching liquid before they are brought together in the channel 4. The rods can then be clamped together with the aid of an unillustrated clamping means for locking the fibers in the channel 4 between the rods 1, 2 and 3. The clamping means may consist of, e.g., a key joint. To provide this, the rods are tapered towards both ends and unillustrated sleeves with tapered central holes are threaded onto the respective ends of the rod bundle, and displaced towards each other for clamping the rods in a direction towards the axis of symmetry 6. The sleeves suitably comprise the same material as the rods. By an unillustrated orifice through one of the rods 1, 2 and 3, directed towards the axis of symmetry 6, a welding means can also be inserted for welding the fiber ends inserted into the channel 4.

Figure 2:
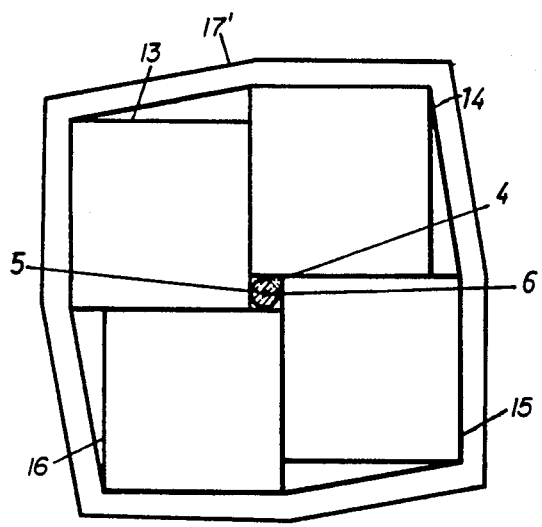
FIG. 2 is an end view of a second embodiment of said apparatus.

An embodiment of the aligning apparatus in accordance with the invention, having four rods 13, 14, 15 and 16 of square section, is illustrated in FIG. 2. The two plane surfaces of the rods that are intended to bear against one of the plane surfaces of each adjacent rod, intersect at an angle of 90° and consequently the cross section of the channel 4 formed between the rods will be square. In this case as well, the aligning apparatus is assumed to be provided with O-ring means 17' for keeping the rods 13, 14, 15 and 16 together, and clamping the fiber ends in the channel 4 between the rods.

In the embodiments illustrated in FIGS. 1 and 2, the angles are the same between the two surfaces of the respective rod, that are intended to bear against a corresponding surface of the adjacent rods. In the case of four rods, the angles between these surfaces on all rods do not however need to be the same, but may be the same in pairs, the cross-sectional shape of the channel then being rhombic.

It is of course also possible to use five or more rods. The essential requirement is that the sum of the angles disposed around the axis of symmetry 6 in the position when the rods are brought together, is 360°.

With the aligning apparatus in accordance with the invention it is thus possible to align fibers of different diameters. Because the rod surfaces bear against each during the entire aligning period a very good aligning accuracy is obtained.

By making at least one of the rods of a transparent material, e.g., glass, the splicing or connecting operation can be supervised visually. In the embodiment according to FIG. 2, the rods can be made from magnetic material and can be magnetized such that they are kept together in order to further facilitate the connecting operation.

Apparatuses of this kind can be made such that they enable alignment of several fibers at the same time. By adding three further rods to the embodiment illustrated in FIG. 1, an apparatus for simultaneously aligning four fibers will be obtained, the number of rods per fiber thus being reduced.

What is claimed is:

1. Apparatus for mutually aligning ends of two optical fibers which are to be connected, comprising at least three rods, arranged parallel in a bundle to form between themselves a channel for accommodating the ends of the two fibers, means for maintaining the rods together and clamping the fiber ends in the channel between the rods, each rod having a polygonal cross-section and at least two plane surfaces intersecting along a longitudinal sharp edge, said rods being assembled such that opposing pairs of said plane surfaces bear flat against one another and are mutually displaced so that a portion of the flat plane surfaces which bear against one another form bounding plane sides of said channel and said longitudinal edges extend parallel to, and are distributed around a longitudinal axis of symmetry of said channel, said rods being slidably adjustable along said plane surfaces to vary the magnitude of said mutual displacement and thereby vary the size of said channel for accommodating fibers of different diameter.

2. Apparatus as claimed in claim 1, in which the two plane surfaces of the respective rods meet at angles that are the same on each rod.

3. Apparatus as claimed in claim 1, in which the two plane surfaces of the respective rods meet at angles that are the same in pairs.

4. Apparatus as claimed in claim 1 wherein said bounding plane sides of said channel, formed by the mutual displacement of the rods, define for said channel a polygonal section, which remains geometrically similar for different size channels.

5. Apparatus as claimed in claim 1 wherein said means which maintains the rods together and clamps the fiber ends in the channel between the rods comprises means for accommodating the slidable adjustment of said rods along said plane surfaces thereof for fibers of different diameter.

* * * * *